July 15, 1947.  H. G. CORNEIL  2,423,846
VAPOR PHASE ISOMERIZATION OF NORMAL PARAFFINS
Filed Dec. 7, 1942
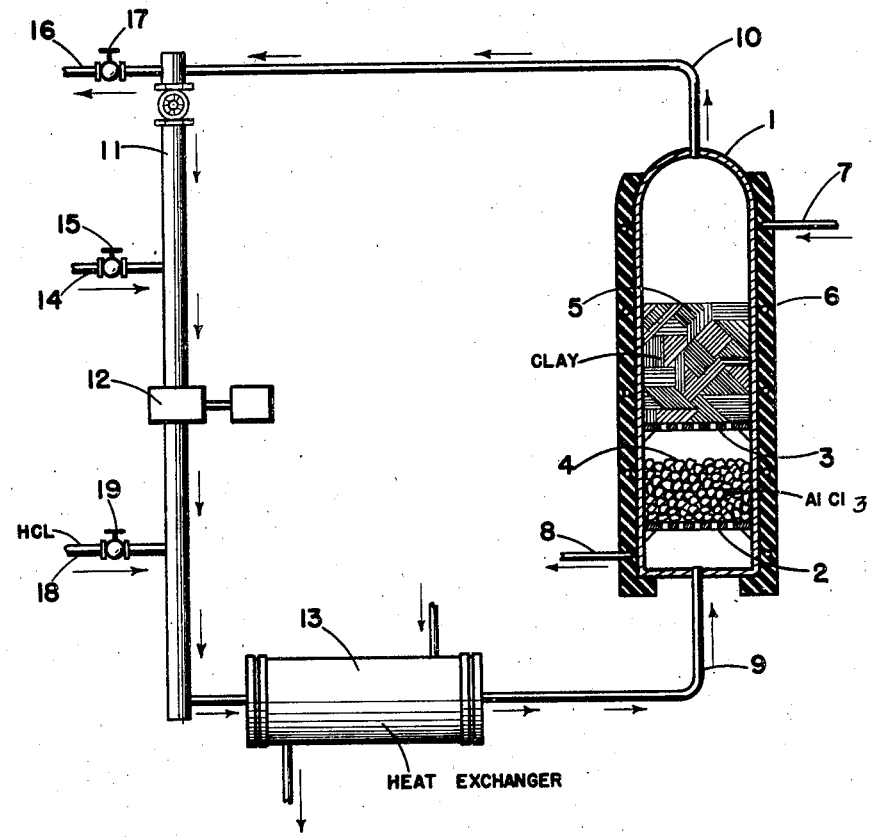
Hampton G. Corneil. INVENTOR.
BY P. J. Whelan
ATTORNEY.

Patented July 15, 1947

2,423,846

UNITED STATES PATENT OFFICE 2,423,846

VAPOR PHASE ISOMERIZATION OF NORMAL PARAFFINS

Hampton G. Corneil, Baytown, Tex., assignor to Standard Oil Development Company, a corporation of Delaware Application December 7, 1942, Serial No. 468,103

2 Claims. (Cl. 260—683.5)

The present invention is directed to catalytic processes in which the catalyst employed is a metal halide deposited on a porous carrier suitable for use in Friedel-Crafts syntheses.

It is well known that the so-called Friedel-Crafts catalysts, such as aluminum chloride, zinc chloride, ferric chloride, zirconium chloride, etc. have exhibited utility in many processes in which they are conventionally employed in conjunction with porous carriers such as alumina, different kinds of clay, active carbon, charcoal, pumice and similar materials. Among these processes may be mentioned the polymerization, alkylation, dehydrogenation, cracking and isomerization of hydrocarbon. Particularly in the latter process aluminum chloride supported on a porous carrier has been found to be an effective catalyst.

In all these processes it has been the practice in the past to prepare the catalyst separately for use in the process. This preparation included the treatment of the carrier for the elimination of water and other impurities and the deposition of the metal halide on the carrier. One of the common methods for preparing an anhydrous aluminum chloride catalyst was to heat a mixture of bauxite and anhydrous aluminum chloride in a rotary kiln with heat supplied to the kiln from an external source. This method of preparation usually employed a kiln operating under pressure. If no pressure were maintained in the kiln substantial losses of aluminum chloride would be incurred. In either case the equipment was substantial and the cost of preparation quite considerable.

Since the catalyst was known to be degraded by moisture care had to be taken both in preparation and in the subsequent handling to keep it in an anhydrous condition. It had to be packaged in air tight drums for transportation and then carefully loaded into the reaction chamber in which it is to be employed.

According to the present invention much of the difficulty and expense incident to separate preparation of the catalyst are avoided by preparing the catalyst in situ in the reaction vessel. Preparation of the catalyst, from the dehydration of the porous carrier to deposition of the metal halide on it, can be performed in the reaction vessel in which the catalyst is to be employed if desired. In view of the fact that the dehydration step usually involves calcination at high temperatures, however, it is preferable to carry out this step in a separate vessel. For the best results the carrier is subjected to an initial calcination at a temperature in the neighborhood of 1100° F. while being exposed to air for a period sufficient to reduce the water content thereof to less than about 0.5% by weight. This treatment results not only in the dehydration of the carrier, but in the oxidation of any metal compounds present therein in a partially reduced state.

In the practice of the present invention such a pretreated carrier is placed in the form of a bed in the reaction vessel proper which, for the sake of illustration, will be considered a vessel intended for the isomerization of normal butane to isobutane. The anhydrous metal halide, in this case anhydrous aluminum chloride in lump form, is arranged in a bed adjacent to the carrier bed. The beds are maintained at an elevated temperature sufficiently high to permit the sublimitation of the aluminum chloride under the pressure conditions obtaining in the vessel. A stream of heated inert gas is then passed through the beds in succession going through the bed of aluminum chloride first. The flow of gas is maintained until the aluminum chloride has all been sublimed and adsorbed on the carrier. Ordinarily, this operation is conducted under conditions not substantially different from those which are maintained during the isomerization itself. Accordingly, as soon as the preparation of the catalyst is completed the vessel may be placed on stream in the isomerization process itself with very little change in conditions, if any. It will be understood, of course, that instead of placing the aluminum chloride in the same vessel with the bed of carrier, it may be placed in a separate vessel. In any case a stream of carrier gas passes first through the bed of aluminum chloride, which, incidentally, may be employed in the liquid state, as well as in lump form. Alternatively, the carrier and the anhydrous aluminum chloride may be mixed together in a single bed and the carrier gas passed through the mixture. Particularly, in this embodiment it is important that the carrier gas be circulated through the reaction vessel so that any aluminum chloride carried off by the gas is returned to the bed containing the carrier.

The nature and objects of the present invention may be better understood from the following detailed description of the accompanying drawing in which an elementary embodiment of an apparatus suitable for carrying it out is illustrated in front elevation in diagrammatic form.

Referring to the drawing in detail, numeral 1 represents a reaction vessel which may be assumed for the purpose of illustration to be an isomerization chamber. This vessel is provided with a pair of perforated trays 2 and 3. On tray 2 is arranged a bed of aluminum chloride 4 in lump form. On tray 3 is arranged a bed 5 of dehydrated oxidized bauxite pretreated in the manner herein before described. The reaction vessel is provided with a heating jacket 6 with an inlet 7 and an outlet 8 for the heating medium.

At the lower part of the reaction vessel is an inlet 9 for the feed to the reaction vessel and at its upper end is an outlet 10 for the reaction products. In the embodiment shown these conduits are connected by a pipe 11 making a complete cycle. In pipe 11 is arranged a pump 12 while in inlet 9 is arranged a heat exchanger 13 for bringing the feed to the desired temperature.

Raw material is introduced into the system through a line 14 provided with a valve 15, while a line 16 controlled by valve 17 is provided for the continuous withdrawal of the reaction product. Pipe 11 is also provided with an inlet 18 controlled by a valve 19 for the introduction into the system of a promoter such as a hydrogen halide.

The system as illustrated is adapted for the isomerization of normal butane to isobutane. With a layer of clay on tray 3 and a layer of aluminum chloride on tray 2, butane is admitted to the system through line 14. Since the isomerization itself is conducted at 325° F. the reaction chamber is brought to this temperature by the use of a suitable heating medium in the heating jacket 6. The butane is also heated to this temperature in the heat exchanger 13 and is pumped through the reaction vessel by pump 12 in vapor form at a flow rate of one volume of liquid butane per over-all volume of bauxite per hour for a period of 12 hours. The system is maintained at a pressure of about 130 pounds per square inch gauge. After about 12 hours the aluminum chloride is all adsorbed on the carrier. Then without changing conditions the circulation of normal butane is continued with the simultaneous introduction of anhydrous hydrogen chloride through line 18 in an amount which may range upwardly to about 8.0 weight per cent based on the butane, the rate of flow of the mixture being regulated to 1.5 volumes of liquid butane per over-all volume of catalyst per hour for a period of 6 hours after which the flow rate is reduced to 1.0.

In operating this system under these conditions a conversion of butane to isobutane occurs to such an extent that the product issuing from chamber 1 through line 10 contains 44% of isobutane by volume on a liquid basis. A portion of this product is continuously withdrawn from the system through line 16, the isobutane separated from the butane and the latter returned to the system. This conversion rate with the catalyst prepared in the aforesaid manner was maintained substantially constant for an operating period of 100 hours indicating a very long catalyst life.

It is, of course, to be understood that the conditions during the catalyst preparation stage need not be the same as during the actual isomerization stage. This method of preparing the catalyst is admirably suitable to isomerization, however, because conditions can be maintained the same in both stages. Actually any temperature above about 275° F. is suitable for the sublimation of the aluminum chloride at a pressure as high as 200 pounds per square inch. Elevated pressures are desirable because they permit rapid heating of the bed at gas velocities lower than would be allowable at pressures in the atmospheric pressure range. The pressure, of course, should not be sufficiently high to cause condensation of the carrier gas. This carrier gas may be any gas which is inert to aluminum chloride under the conditions of operation, such as, moisture-free air, carbon dioxide, oxygen, nitrogen, propane, butane, or other hydrocarbon, or any combination of these gases. The temperature may range as high as 500° F. and the pressure to 35 atmospheres or greater depending upon the carrier gas employed. In the event that a carrier gas other than butane is employed it is entirely removed from the system through line 16 after all of the aluminum chloride is adsorbed on the clay and only then is butane fed into the system through line 14. By way of example, it may be mentioned that with an inert gas pressure of 200 pounds per square inch and a temperature of 300° F. a pound mole (133 pounds) of aluminum chloride can be vaporized at 300° F. by employing 105 mols of normal butane (611 pounds).

It will be apparent that the advantages of the present invention can be realized in reactions other than isomerization, as well as with catalysts other than aluminum chloride on a porous carrier. The invention results in a considerable economy in operation, as well as simplification of equipment.

The nature and objects of the present invention having been thus described and illustrated, what is claimed as new and useful and is desired to be secured by Letters Patent is:

1. A method for isomerizing normal paraffinic hydrocarbons to isoparaffinic hydrocarbons in a reaction system in which a body of a metal halide vaporizable at a temperature not substantially in excess of 500° F. is arranged ahead of a bed of porous material adapted to adsorb said metal halide, said porous material being maintained at a reaction temperature between about 275 and 500° F. such that it will adsorb and retain the major portion of any metal halide contacted with it comprising passing a vaporized normal paraffinic hydrocarbon containing more than three carbon atoms in sequence through the body of metal halide and the bed of porous material for a length of time sufficient to transfer the desired quantity of the metal halide to and deposit it on the porous material, thereafter continuing passage of the vaporized normal paraffinic hydrocarbon through the bed of porous material alone while adding thereto a gaseous halide promoter for the isomerization thereof and recovering isomerized hydrocarbons from the products leaving the reaction system the halide promoter being added to the hydrocarbon only at such times when the latter does not carry metal halide.

2. A method according to claim 1 in which the porous material is bauxite and the metal halide is aluminum chloride and the operating temperature is between about 275° and 350° F.

HAMPTON G. CORNEIL.

(References on following page)

REFERENCES CITED

The following references are of record in the file of this patent:

UNITED STATES PATENTS

| Number | Name | Date |
|---|---|---|
| 2,223,180 | Lynch et al. | Nov. 26, 1940 |
| 2,277,022 | McMillan et al. | Mar. 17, 1942 |
| 2,281,924 | De Simo et al. | May 5, 1942 |
| 2,301,615 | Chenicek et al. | Nov. 10, 1942 |
| 2,316,247 | Ipatieff et al. | Apr. 13, 1943 |
| 2,342,124 | Danforth | Feb. 22, 1944 |
| 2,311,713 | Thomas et al. | Feb. 23, 1943 |
| 2,342,123 | Danforth | Feb. 22, 1944 |
| 2,354,851 | Danforth | Aug. 1, 1944 |
| 2,311,712 | Thomas | Feb. 23, 1943 |

FOREIGN PATENTS

| Number | Country | Date |
|---|---|---|
| 625,740 | France | Apr. 30, 1927 |